US012597274B2

(12) United States Patent
Kuang et al.

(10) Patent No.: US 12,597,274 B2
(45) Date of Patent: Apr. 7, 2026

(54) COCKPIT SYSTEM ADJUSTMENT APPARATUS AND COCKPIT SYSTEM ADJUSTMENT METHOD

(71) Applicant: Shenzhen Yinwang Intelligent Technologies Co., Ltd., Shenzhen (CN)

(72) Inventors: Li Kuang, Dongguan (CN); Shuyue Chen, Dongguan (CN); Shihua Yang, Dongguan (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 288 days.

(21) Appl. No.: 17/983,600

(22) Filed: Nov. 9, 2022

(65) Prior Publication Data

US 2023/0073986 A1 Mar. 9, 2023

Related U.S. Application Data

(63) Continuation of application No. PCT/CN2021/093205, filed on May 12, 2021.

(30) Foreign Application Priority Data

May 15, 2020 (CN) .......................... 202010412998.1

(51) Int. Cl.
*G06V 20/59* (2022.01)
*B60K 35/10* (2024.01)
(Continued)

(52) U.S. Cl.
CPC ............ *G06V 20/59* (2022.01); *B60K 35/235* (2024.01); *B60K 35/28* (2024.01); *B60K 35/90* (2024.01);
(Continued)

(58) Field of Classification Search
CPC ............ G02B 27/0101; G02B 27/0093; G02B 2027/014; G02B 2027/0138; B60K 35/00;
(Continued)

(56) References Cited

U.S. PATENT DOCUMENTS

2010/0157430 A1 6/2010 Hotta et al.
2012/0154441 A1* 6/2012 Kim ................... G08G 1/09623
345/633

(Continued)

FOREIGN PATENT DOCUMENTS

CN 105774679 A 7/2016
CN 107139930 A 9/2017
(Continued)

OTHER PUBLICATIONS

Vamsi et al.,"Automatic Seat Adjustment using Face Recognition", 2020 International Conference on Inventive Computation Technologies (ICICT). IEEE, 2020, 5 pages.

*Primary Examiner* — Yaron Cohen
(74) *Attorney, Agent, or Firm* — Leydig, Voit & Mayer, Ltd.

(57) ABSTRACT

A cockpit system adjustment apparatus and a cockpit system adjustment method. The apparatus includes: a calibration control module, configured to control a HUD device to display a plurality of AR calibration points to a user; an image obtaining module, configured to obtain a user image generated when the user watches the plurality of AR calibration points; and a processing module, configured to: determine, based on the user image and location information of the plurality of AR calibration points, observation angle information generated when the user watches the plurality of AR calibration points and height information of the user; and determine, based on the observation angle information and the height information, cockpit system configuration information applicable to the user. The cockpit system (Continued)

configuration information includes a HUD device configuration parameter and a seat device configuration parameter.

20 Claims, 5 Drawing Sheets

(51) Int. Cl.

| | |
|---|---|
| *B60K 35/235* | (2024.01) |
| *B60K 35/28* | (2024.01) |
| *B60K 35/65* | (2024.01) |
| *B60K 35/90* | (2024.01) |
| *B60N 2/02* | (2006.01) |
| *G06F 3/01* | (2006.01) |
| *G06V 40/16* | (2022.01) |
| *G06V 40/18* | (2022.01) |

(52) U.S. Cl.

CPC ......... *B60N 2/0252* (2013.01); *B60N 2/0274* (2023.08); *G06F 3/013* (2013.01); *G06V 40/172* (2022.01); *G06V 40/18* (2022.01); *B60K 35/10* (2024.01); *B60K 35/65* (2024.01); *B60K 2360/177* (2024.01)

(58) Field of Classification Search

CPC ........ B60K 35/28; B60K 35/23; B60K 35/10; B60K 35/65; B60K 2360/177; B60K 35/90; B60K 2360/149; B60K 35/235; G06V 40/172; G06V 40/18; G06V 40/19; G06V 20/59; B60W 50/0098; B60W 2420/403; B60W 2540/225; B60W 2540/043; B60W 2050/0083; B60R 16/037; B60N 2/0252; B60N 2/0274; B60N 2210/24; G06F 3/013

See application file for complete search history.

(56) References Cited

U.S. PATENT DOCUMENTS

| | | | |
|---|---|---|---|
| 2017/0253252 A1* | 9/2017 | Donnelly ............. G06F 3/0346 |
| 2018/0096475 A1 | 4/2018 | Jemander et al. |
| 2018/0204365 A1 | 7/2018 | Lee et al. |
| 2019/0004411 A1 | 1/2019 | Ito |
| 2019/0187790 A1 | 6/2019 | Woo et al. |

FOREIGN PATENT DOCUMENTS

| | | | |
|---|---|---|---|
| CN | 107521411 | A | 12/2017 |
| CN | 109204326 | A | 1/2019 |
| CN | 109507799 | A | 3/2019 |
| CN | 109515361 | A | 3/2019 |
| CN | 110203140 | A | 9/2019 |
| CN | 110733447 | A | 1/2020 |
| CN | 111016785 | A | 4/2020 |
| CN | 111038402 | A | 4/2020 |
| CN | 114407903 | A | 4/2022 |
| DE | 102013212765 | A1 | 12/2014 |
| JP | 5992130 | B2 | 9/2016 |
| KR | 20160069451 | A | 6/2016 |
| KR | 102079351 | B1 | 2/2020 |
| WO | 2017002312 | A1 | 1/2017 |
| WO | 2019176448 | A1 | 9/2019 |
| WO | 2019176878 | A1 | 9/2019 |

* cited by examiner

Cockpit system adjustment method 700

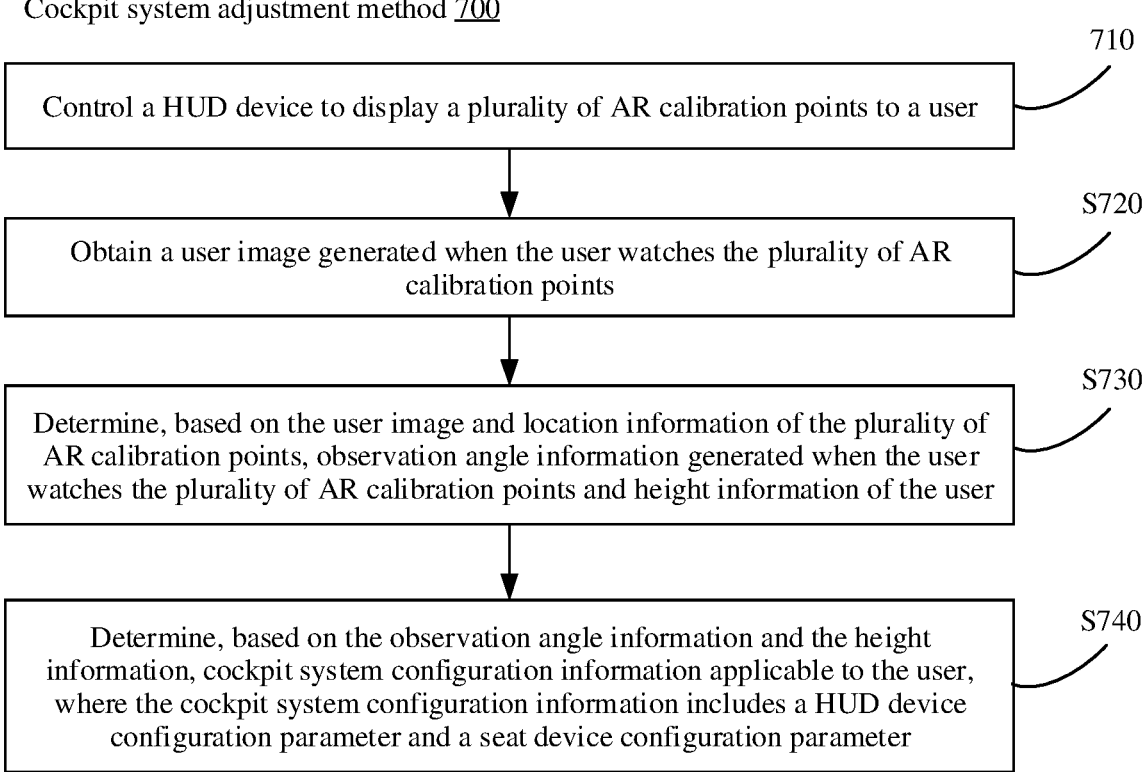

710

Control a HUD device to display a plurality of AR calibration points to a user

S720

Obtain a user image generated when the user watches the plurality of AR calibration points

S730

Determine, based on the user image and location information of the plurality of AR calibration points, observation angle information generated when the user watches the plurality of AR calibration points and height information of the user

S740

Determine, based on the observation angle information and the height information, cockpit system configuration information applicable to the user, where the cockpit system configuration information includes a HUD device configuration parameter and a seat device configuration parameter

FIG. 7

COCKPIT SYSTEM ADJUSTMENT APPARATUS AND COCKPIT SYSTEM ADJUSTMENT METHOD

CROSS-REFERENCE TO RELATED APPLICATIONS

This application is a continuation application of International Application No. PCT/CN2021/093205, filed on May 12, 2021, which claims priority to Chinese Patent Application No. 202010412998.1, filed on May 15, 2020. The disclosures of the aforementioned applications are hereby incorporated by reference in their entireties.

TECHNICAL FIELD

The embodiments relate to the field of in-vehicle systems, a cockpit system adjustment apparatus, and a cockpit system adjustment method.

BACKGROUND

A driver expects that a seat device in a transportation tool can be adjusted automatically to accommodate different heights and weights, so as to achieve optimal driving comfort. In an existing solution, information such as a height, a weight, and a spatial relative location of the driver is usually obtained by using technologies such as human eye tracking and additional auxiliary detection (for example, infrared detection and/or pressure sensing), to correspondingly adjust the seat device to improve the driving comfort.

The existing solution focuses on only automatically adjusting the seat device to improve the driving comfort. However, currently, increasingly more transportation tools have a head-up display (HUD) device. In addition to automatically adjusting the seat device to achieve optimal driving comfort, the driver further expects that the HUD device can be automatically adjusted to achieve an optimal observation effect. The HUD device, the seat device, and the like may be collectively referred to as a cockpit system. Neither of a current cockpit system adjustment apparatus and a current cockpit system adjustment method can simultaneously satisfy the two expectations of the driver.

SUMMARY

The embodiments may provide a cockpit system adjustment apparatus and a cockpit system adjustment method, so that a user can simultaneously achieve a good observation effect and high driving comfort.

According to a first aspect, a cockpit system adjustment apparatus is provided, where the apparatus includes: a calibration control module, configured to control a HUD device to display a plurality of AR calibration points to a user; an image obtaining module, configured to obtain a user image generated when the user watches the plurality of AR calibration points; and a processing module, configured to: determine, based on the user image and location information of the plurality of AR calibration points, observation angle information generated when the user watches the plurality of AR calibration points and height information of the user; and determine, based on the observation angle information and the height information, cockpit system configuration information applicable to the user. The cockpit system configuration information includes a HUD device configuration parameter and a seat device configuration parameter.

The cockpit system adjustment apparatus in the first aspect displays the plurality of AR calibration points to the user, obtains the user image generated when the user watches the plurality of AR calibration points, determines the observation angle information and the height information of the user based on the user image, and determines, based on the observation angle information and the height information, the HUD device configuration parameter and the seat device configuration parameter that are applicable to the user, so that the user can simultaneously achieve a good observation effect and high driving comfort. In addition, no additional infrared detection or pressure sensing device is required. This can reduce system costs.

It should be understood that the plurality of AR calibration points may be calibration points given at locations for the purpose of improving driving safety. In this case, the determined cockpit system configuration information helps improve driving safety.

In a possible implementation of the first aspect, the processing module may be configured to determine the observation angle information and the height information based on the location information of the plurality of AR calibration points by performing image analysis processing and human eye tracking processing on the user image. In this possible implementation, based on the user image and the location information of the plurality of AR calibration points and algorithms such as image analysis and human eye tracking, information such as an observation angle and a height for subsequent calculation can be easily and quickly extracted from the image.

It should be understood that there is a triangular geometric relationship among several values such as a human eye location, a location of an AR calibration point, an observation angle, and a depth. The observation angle information and a depth from the user to a steering wheel may be determined based on the triangular geometric relationship.

In a possible implementation of the first aspect, the processing module may be configured to: determine a total height and a leg length of the user based on the height information; determine a depth from the user to a steering wheel based on the observation angle information; and determine, based on the observation angle information, the total height, the leg length, and the depth, the cockpit system configuration information applicable to the user. The observation angle information represents observation comfort of the user, and the total height, the leg length, and the depth determine driving comfort of the user. Therefore, the cockpit system configuration information applicable to the user can be accurately determined based on the observation angle information, the total height, the leg length, and the depth.

In a possible implementation of the first aspect, the processing module may be configured to determine, based on deviation values obtained by comparing the observation angle information, the total height, the leg length, and the depth with prestored cockpit system configuration information in a cockpit system configuration information base, the cockpit system configuration information applicable to the user. In an actual cockpit system, an optimal observation location and a most comfortable driving location of the user are usually different. In this implementation, an observation angle of a driver at the optimal observation location and parameters of a total height, a leg length, and a depth of the driver at the most comfortable driving location may be obtained by using a pre-experiment record, and an observation angle error function and a comfortable driving location error function are properly designed, so that a sum of the two error functions is minimum. In this way, a location for optimal balance between an observation effect and driving comfort can be found.

In a possible implementation of the first aspect, the apparatus further includes a storage module, configured to store the cockpit system configuration information applicable to the user and identity information of the user in a user identity information base. In this implementation, the cockpit system configuration information applicable to the user and the identity information of the user are recorded in the user identity information base, so that it can be convenient for the user to find the information for use next time.

In a possible implementation of the first aspect, the identity information includes face information. The processing module is further configured to: obtain the face information of the user; and find, based on the face information and the user identity information base, the cockpit system configuration information applicable to the user and that matches the face information. The apparatus further includes a device control module, configured to adjust the HUD device and a seat device based on the HUD device configuration parameter and the seat device configuration parameter that are applicable to the user. In this implementation, the face information of the user is obtained. If the user identity information base includes matched face information, no calibration needs to be performed again, and the cockpit system configuration information applicable to the user and that matches the face information can be found directly and quickly.

In a possible implementation of the first aspect, the HUD device configuration parameter includes at least one of a spatial light modulator (SLM) configuration parameter, a scattering screen configuration parameter, an image source configuration parameter, or a projection system translation configuration parameter. The scattering screen configuration parameter may include a rotation angle of a scattering screen. The image source configuration parameter may include an imaging parameter of an image source, such as a size, brightness, and a location of the image source. The projection system translation configuration parameter may include a parameter related to up-down translation, left-right translation, or front-back translation of a projection system in space. The seat device configuration parameter may include at least one of a height, a front-back location, a left-right location, and an inclination angle of a seat.

According to a second aspect, a cockpit system adjustment method is provided. A cockpit system includes a head-up display HUD device and a seat device. The method includes: controlling the HUD device to display a plurality of augmented reality AR calibration points to a user; obtaining a user image generated when the user watches the plurality of AR calibration points; determining, based on the user image and location information of the plurality of AR calibration points, observation angle information generated when the user watches the plurality of AR calibration points and height information of the user; and determining, based on the observation angle information and the height information, cockpit system configuration information applicable to the user. The cockpit system configuration information includes a HUD device configuration parameter and a seat device configuration parameter.

In a possible implementation of the second aspect, the determining, based on the user image and location information of the plurality of AR calibration points, observation angle information generated when the user watches the plurality of AR calibration points and height information of the user includes: determining the observation angle information and the height information based on the location information of the plurality of AR calibration points by performing image analysis processing and human eye tracking processing on the user image.

In a possible implementation of the second aspect, the determining, based on the observation angle information and the height information, cockpit system configuration information applicable to the user includes: determining a total height and a leg length of the user based on the height information; determining a depth from the user to a steering wheel based on the observation angle information; and determining, based on the observation angle information, the total height, the leg length, and the depth, the cockpit system configuration information applicable to the user.

In a possible implementation of the second aspect, the determining, based on the observation angle information, the total height, the leg length, and the depth, the cockpit system configuration information applicable to the user includes: determining, based on deviation values obtained by comparing the observation angle information, the total height, the leg length, and the depth with prestored cockpit system configuration information in a cockpit system configuration information base, the cockpit system configuration information applicable to the user.

In a possible implementation of the second aspect, the method further includes: storing the cockpit system configuration information applicable to the user and identity information of the user in a user identity information base.

In a possible implementation of the second aspect, the identity information includes face information. The method further includes: obtaining the face information of the user; finding, based on the face information and the user identity information base, the cockpit system configuration information that is applicable to the user and that matches the face information; and adjusting the HUD device and the seat device based on the HUD device configuration parameter and the seat device configuration parameter.

According to a third aspect, a non-transitory computer-readable medium is provided, configured to store a computer program, where the computer program includes instructions for performing the method in any one of the second aspect or the possible implementations of the second aspect.

According to a fourth aspect, a cockpit system is provided, and includes the cockpit system adjustment apparatus in any one of the first aspect or the possible implementations of the first aspect, a head-up display HUD device, and a seat device.

The embodiments may be applied to a vehicle or may be applied to other transportation tools such as an aircraft, a spacecraft, and a ship.

BRIEF DESCRIPTION OF THE DRAWINGS

FIG. 7 is a schematic flowchart of a cockpit system adjustment method according to an embodiment.

DETAILED DESCRIPTION OF THE EMBODIMENTS

The following describes the embodiments with reference to accompanying drawings.

Figure 1:
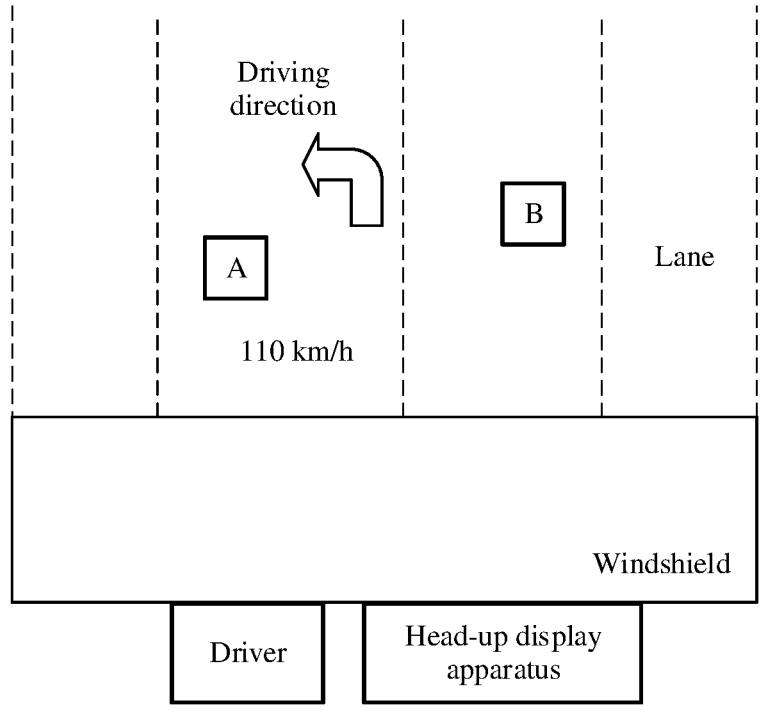
FIG. 1 is a schematic diagram of a HUD scenario.

FIG. 1 is a schematic diagram of a HUD scenario. A HUD device is a HUD device based on augmented reality (AR). As shown in FIG. 1, the HUD device may be installed near a windshield. It is assumed that in the HUD scenario, in front of a driver or a front passenger, there is an object A and an object B (for example, a vehicle traveling ahead and a pedestrian passing by) outside the windshield. The HUD device can image, by using the windshield or glass, a reflector, and the like (which are collectively referred to as an optical reflection module) near the windshield, a driving speed, a driving direction, a virtual image of related information of the object A, and a virtual image of related information of the object B outside the windshield, to help the driver see the driving information without lowering the head or turning the head. An example in which an optical reflection unit is a windshield is used for subsequent description.

An existing solution is only to automatically adjust a seat device in a cockpit system to improve driving comfort. When the cockpit system further includes a HUD device, a driver further expects that the HUD device can be automatically adjusted to achieve an optimal observation effect. Neither of a current cockpit system adjustment apparatus and a current cockpit system adjustment method can simultaneously satisfy the two expectations of the driver. In addition, in the existing solution, information such as a height, a weight, and a spatial relative location of the driver is usually obtained by using technologies such as human eye tracking and additional auxiliary detection (for example, infrared detection and/or pressure sensing), to correspondingly adjust the seat device to improve the driving comfort. Devices for infrared detection and/or pressure sensing are configured to obtain a depth of the driver relative to a steering wheel, and the devices increase system costs.

For the foregoing problem, with reference to the accompanying drawings, the following describes in detail a cockpit system adjustment apparatus and a cockpit system adjustment method.

It should be understood that the embodiments may be applied to the automotive field, the aerospace field, and the navigation field. For example, the embodiments may be applied to a vehicle or may be applied to other transportation tools such as an aircraft, a spacecraft, and a ship. This is not limited in the embodiments. The vehicle, the aircraft, the spacecraft, the ship, and the like may be collectively referred to as transportation tools. The following uses the vehicle as an example for description.

Figure 2:
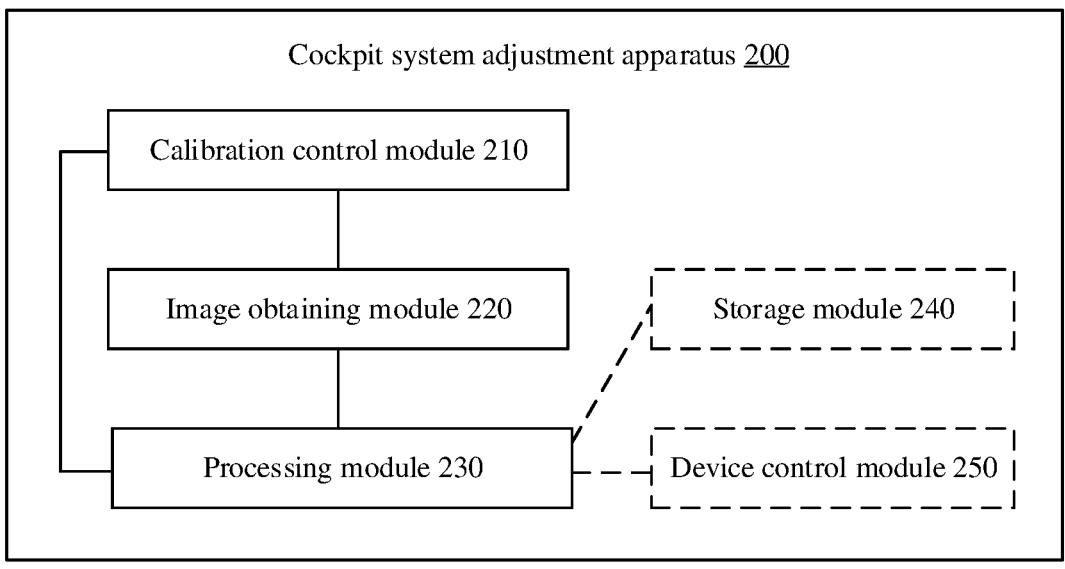
FIG. 2 is a schematic block diagram of a cockpit system adjustment apparatus according to an embodiment.

The embodiments may provide a cockpit system adjustment apparatus. A cockpit system includes a HUD device and a seat device. FIG. 2 is a schematic block diagram of a cockpit system adjustment apparatus 200 according to an embodiment. As shown in FIG. 2, the cockpit system adjustment apparatus 200 includes a calibration control module 210, an image obtaining module 220, and a processing module 230. The calibration control module 210 is configured to control a HUD device to display a plurality of augmented reality (AR) calibration points to a user; the image obtaining module 220 is configured to obtain a user image generated when the user watches the plurality of AR calibration points; and the processing module 230 is configured to: determine, based on the user image generated when the user watches the plurality of AR calibration points and location information of the plurality of AR calibration points, observation angle information generated when the user watches the plurality of AR calibration points and height information of the user; and determine, based on the observation angle information and the height information, cockpit system configuration information applicable to the user. The cockpit system configuration information includes a HUD device configuration parameter and a seat device configuration parameter.

The cockpit system adjustment apparatus in this embodiment displays the plurality of AR calibration points to the user, obtains the user image generated when the user watches the plurality of AR calibration points, determines the observation angle information and the height information of the user based on the user image, and determines, based on the observation angle information and the height information, the HUD device configuration parameter and the seat device configuration parameter that are applicable to the user, so that the user can simultaneously achieve a good observation effect and high driving comfort. In addition, no additional infrared detection or pressure sensing device is required. This can reduce system costs.

Figure 3:
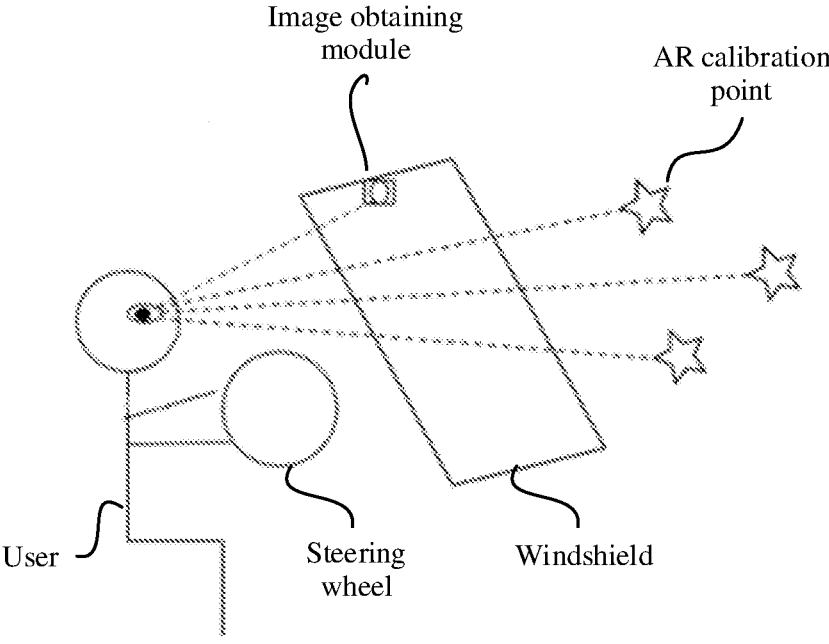
FIG. 3 is a schematic diagram of a scenario in which a cockpit system adjustment apparatus according to an embodiment is used.

FIG. 3 is a schematic diagram of a scenario in which the cockpit system adjustment apparatus according to this embodiment is used. As shown in FIG. 3, a user (driver) is sitting in a driver's seat (behind a steering wheel), and a depth from the user to the steering wheel may be understood as a distance between the user and the steering wheel in a horizontal direction. For example, the depth may be a distance from the center of the steering wheel to the body of the user in a horizontal direction, or the depth may be a distance from the center of the steering wheel to the eye of the user, or the depth may be another value. This is not limited. The image obtaining module in the cockpit system adjustment apparatus in this embodiment may be installed in an upper middle part of a windshield, or at the top of a vehicle, to help photograph the user. This is not limited. The HUD device generates virtual images (projections) of the plurality of AR calibration points on the windshield and prompts the user to watch. The image obtaining module obtains the user image generated when the user watches the plurality of AR calibration points, for subsequent analysis and processing.

In some embodiments, the calibration control module 210 sends an instruction to the HUD device to instruct the HUD device to display the plurality of AR calibration points. The plurality of AR calibration points may be calibration points given at locations for the purpose of determining an optimal observation angle of the user or may be calibration points given at locations for the purpose of improving driving safety or may be calibration points given at locations for the foregoing two purposes or may be calibration points given at locations for another purpose. This is not limited.

The plurality of AR calibration points may be calibration points that are distributed in four locations: the top, the bottom, the left, and the right on the windshield. The plurality of AR calibration points may alternatively be a plurality of calibration points evenly or unevenly distributed on a circle on the windshield. The plurality of AR calibration points may alternatively be a plurality of calibration points arranged in another form. This is not limited.

In this embodiment, a text or a mark may be displayed on the windshield to prompt the user to separately watch the plurality of AR calibration points. In this embodiment, a form of an AR calibration point in the plurality of AR calibration points may be changed to prompt the user to watch the AR calibration point. For example, an AR calibration point may be displayed with higher brightness or enabled to flicker. In this embodiment, voice guidance may be used to prompt the user to separately watch the plurality of AR calibration points. This is not limited.

In some embodiments, the image obtaining module 220 may be an in-vehicle built-in camera, a common camera, or another photographing device. This is not limited. The user image obtained by the image obtaining module 220 may be a plurality of images or may be one or more videos. This is not limited.

In some embodiments, the processing module 230 may determine, based on the user image and the location information of the plurality of AR calibration points, the observation angle information generated when the user watches the plurality of AR calibration points and the height information of the user may include: determining the observation angle information and the height information based on the location information of the plurality of AR calibration points by performing image analysis processing and human eye tracking (also referred to as gaze tracking) processing on the user image. Human eye tracking may be implemented based on the conventional technology, for example, based on a human eye tracking algorithm. Details are not described herein. Based on algorithms such as image analysis and human eye tracking, information such as an observation angle and a height for subsequent calculation can be easily and quickly extracted from the image. The location information of the plurality of AR calibration points may be determined by the calibration control module 210 and sent to the processing module 230 or may be prestored in the cockpit system adjustment apparatus 200. This is not limited.

Related information in the image may be extracted through the image analysis processing and the human eye tracking processing. For example, face information may be obtained according to a facial recognition algorithm. The facial recognition algorithm may be an existing algorithm, such as an eigenface algorithm, a local binary pattern (LBP) algorithm, or a neural network (NN) algorithm. This is not limited.

A human eye (pupil) location, a pupil distance, and the like may be obtained according to the human eye tracking algorithm, and then the observation angle information and the depth from the user to the steering wheel may be obtained through calculation based on location information of an AR calibration point.

A reason why the observation angle information and the depth from the user to the steering wheel can be obtained through calculation based on the human eye location and the location information of the AR calibration point is that there is a triangular geometric relationship among several values such as the human eye location, the location of the AR calibration point, the observation angle, and the depth. When the user observes an AR calibration point at different spatial locations, observation angles of the user's eye are different.

Figure 4:
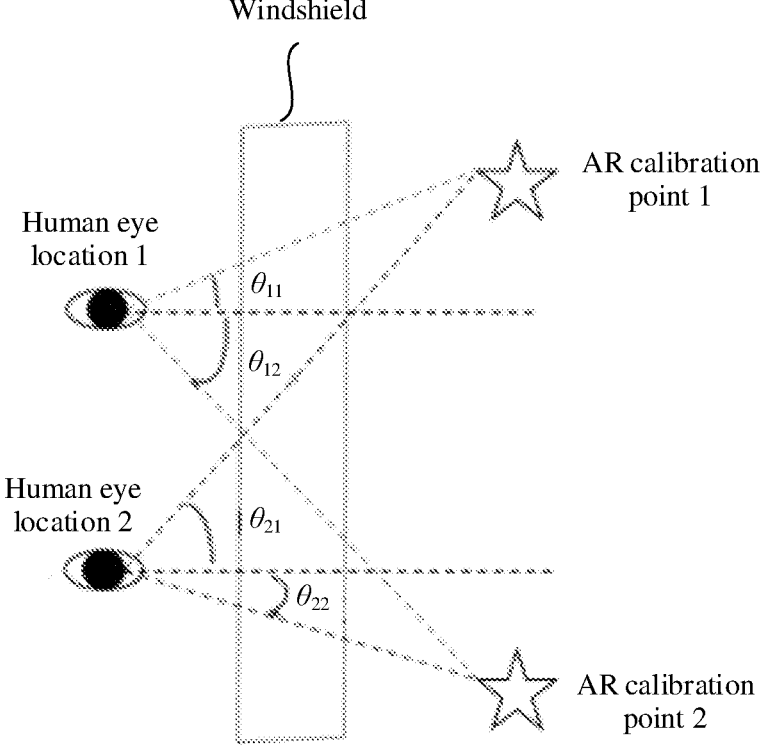
FIG. 4 is a schematic diagram of observation angles for different AR calibration points during left-right translation of a human eye location in a monocular observation case.

FIG. 4 is a schematic diagram of observation angles for different AR calibration points during left-right translation of a human eye location in a monocular observation case. An observation angle of observing an AR calibration point 1 at a human eye location 1 is 011. An observation angle of observing an AR calibration point 2 at the human eye location 1 is 012. An observation angle of observing the AR calibration point 1 at a human eye location 2 is 021. An observation angle of observing the AR calibration point 2 at the human eye location 2 is 022. According to the triangular geometric relationship, other data (for example, an observation angle and a depth) can be obtained when some data is known.

Figure 5:
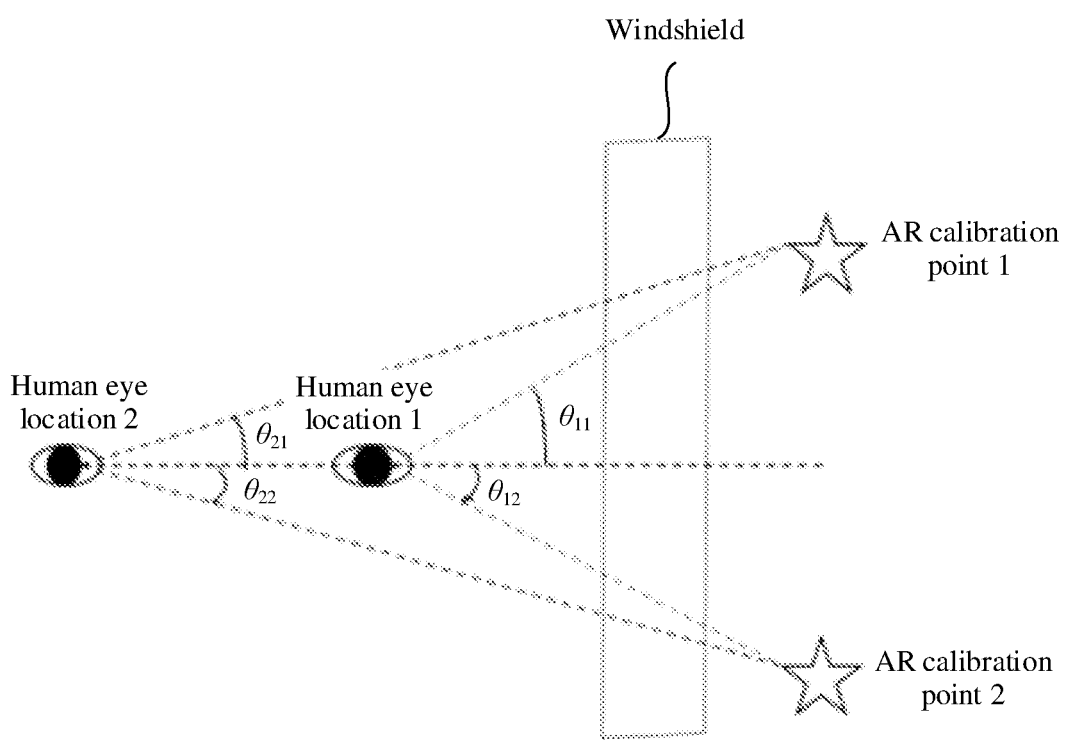
FIG. 5 is a schematic diagram of observation angles for different AR calibration points during front-back translation of a human eye location in a monocular observation case.

FIG. 5 is a schematic diagram of observation angles for different AR calibration points during front-back translation of a human eye location in a monocular observation case. An observation angle of observing an AR calibration point 1 at a human eye location 1 is 011. An observation angle of observing an AR calibration point 2 at the human eye location 1 is 012. An observation angle of observing the AR calibration point 1 at a human eye location 2 is 021. An observation angle of observing the AR calibration point 2 at the human eye location 2 is 022. According to the triangular geometric relationship, other data (for example, an observation angle and a depth) can be obtained when some data is known.

A relative height of a person in a cockpit may be recognized according to a height recognition algorithm, so as to obtain height information such as a total height, an upper body part height, and a leg length of the person. For example, in an embodiment, a height model base may be stored. The processing module can obtain the foregoing height information based on the height model base by using the user image as an input.

The foregoing information obtained according to various algorithms may be based on various model parameter bases (which may be artificial intelligence (AI) model parameter bases). For example, the AI model parameter base may be obtained through offline AI training or may be configured in the cloud or in the local cockpit system adjustment apparatus. Other information may further be obtained through calculation based on the foregoing information. This is not limited.

In some embodiments, that the processing module 230 determines, based on the observation angle information and the height information, the cockpit system configuration information applicable to the user may include: determining a total height and a leg length of the user based on the height information; determining a depth from the user to a steering wheel based on the observation angle information; and determining, based on the observation angle information, the total height, the leg length, and the depth, the cockpit system configuration information applicable to the user. The foregoing has mentioned that the total height and the leg length of the user are determined based on the height information; and the depth from the user to the steering wheel is determined based on the observation angle information. A series of observation angle information generated when watching the plurality of AR calibration points may be denoted as $\{\theta\}$, the total height of the user may be denoted as h, the leg length may be denoted as l, and the depth from the user to the steering wheel may be denoted as d. The observation angle information $\{\theta\}$ represents observation comfort of the user, and $\{h, l, d\}$ determine driving comfort of the user. Therefore, the cockpit system configuration information applicable to the user can be accurately determined based on the observation angle information $\{\theta\}$, the total height h, the leg length l, and the depth d.

In an example, the cockpit system configuration information may be obtained based on the observation angle information $\{\theta\}$, the total height h, the leg length l, and the depth d through empirical formula-based calculation or modeling-based calculation.

In another example, the cockpit system configuration information applicable to the user may be determined based on deviation values obtained by comparing the observation angle information $\{\theta\}$, the total height h, the leg length l, and the depth d with prestored cockpit system configuration information in a cockpit system configuration information base.

The cockpit system configuration information base may be obtained through offline AI training and record a series of prestored cockpit system configuration information. The prestored cockpit system configuration information may include prestored observation angle information $\{\theta\}$; a prestored total height h, leg length l, and depth d; and a corresponding HUD device configuration parameter and seat device configuration parameter. The foregoing prestored observation angle information $\{\theta\}$, total height h, leg length l, and depth d may be obtained through pre-experiment measurement or calculation and verification or training and represent optimal balance between an observation effect and driving comfort. In addition, a HUD device configuration parameter and a seat device configuration parameter based on the optimal balance are recorded.

In an actual cockpit system, an optimal observation location and a most comfortable driving location of the user are usually different. An observation angle $\{\theta'\}$ of a driver at the optimal observation location and parameters $\{h^*, l^*, d^*\}$ of a total height, a leg length, and a depth of the driver at the most comfortable driving location may be obtained by using a pre-experiment record. In this example, error functions $C(\{\theta\}, \{\theta^*\})$ and $C(\{h, l, d\}, \{h^*, l^*, d^*\})$ may be properly designed, so that a sum of the two error functions is minimum. In this way, a location for optimal balance between an observation effect and driving comfort can be found.

In some embodiments, the HUD device configuration parameter includes at least one of a spatial light modulator (SLM) configuration parameter, a scattering screen configuration parameter, an image source configuration parameter, and a projection system translation configuration parameter.

An SLM may be a liquid crystal on silicon (LCOS) element, a liquid crystal display (LCD), a digital micromirror device (DMD), or another component. This is not limited. That the SLM is an LCOS element is used as an example, and the SLM configuration parameter may include a rotation angle of the LCOS element. This is not limited.

A scattering screen may be a carrier available for projection imaging, for example, a diffuser or a curtain. This is not limited. The scattering screen configuration parameter may include a rotation angle of the scattering screen. This is not limited.

The image source configuration parameter may include an imaging parameter of an image source, such as a size, brightness, and a location of the image source. This is not limited.

The projection system translation configuration parameter may include a parameter related to up-down translation, left-right translation, or front-back translation of a projection system in space. This is not limited.

The seat device configuration parameter may include at least one of a height, a front-back location, a left-right location, and an inclination angle of a seat, but the embodiments are not limited thereto.

In some embodiments, the cockpit system adjustment apparatus 200 may further include a storage module 240, configured to store the cockpit system configuration information applicable to the user and identity information of the user in a user identity information base. Information is recorded in the user identity information base, so that it can be convenient for the user to find the information for use next time. Each record in the user identity information base may include an identity information item and a cockpit system configuration information item, to record identity information of each user and corresponding cockpit system configuration information for optimal balance between an observation effect and driving comfort. Content of the identity information item may include face information, an identification (ID) code, and the like. This is not limited.

The foregoing described embodiments may be applied to a calibration process or may be applied to a configuration and adjustment process. From a perspective of the configuration and adjustment process, the cockpit system adjustment apparatus 200 may further include a device control module 250, configured to adjust the HUD device and a seat device based on the HUD device configuration parameter and the seat device configuration parameter that are applicable to the user.

It should be understood that the device control module 250 may communicate with the processing module 230 in a wired or wireless manner. Usually, the wired manner may be used to ensure reliability, but this is not limited. The device control module 250 may be divided into a HUD device control submodule and a seat device control submodule that are respectively configured to control the HUD device and the seat device, but this is not limited.

To improve a processing speed, a face of the user may be obtained by using the image obtaining module 220 (the face may be obtained in a case in which an AR calibration point is not displayed or watched or a case in which an AR calibration point is watched, and this is not limited). The processing module 230 may be further configured to: obtain face information of the user; and if the user identity information base includes matched face information, find the cockpit system configuration information applicable to the user and that matches the face information. Then, the device control module 250 may adjust the HUD device and the seat device based on the HUD device configuration parameter and the seat device configuration parameter that are applicable to the user. If the user identity information base does not include matched face information, the foregoing calibration process is performed.

In other words, the identity information of the user may be searched for in the user identity information base by using the image obtaining module and the processing module. If the identity information of the user already exists, no calibration process needs to be performed, and historical cockpit system configuration information in the user identity information base is directly used. If the identity information of the user does not exist, it indicates that the user is a new user, and the calibration process is performed.

Correspondingly, in an embodiment, the identity information includes face information. The processing module 230 is further configured to: obtain the face information of the user; and find, based on the face information and the user identity information base, the cockpit system configuration information that is applicable to the user and that matches the face information. The apparatus further includes a device control module, configured to adjust the HUD device and the seat device based on the HUD device configuration parameter and the seat device configuration parameter that are applicable to the user.

It should be understood that various databases, such as the height model base, the cockpit system configuration information base, and the user identity information base, may be configured in the local cockpit system adjustment apparatus, or may be configured in the cloud. This is not limited. When the database is configured in the cloud, the cockpit system adjustment apparatus should also be configured with a communications module configured to communicate with the cloud.

It should further be understood that modules, such as the calibration control module, the image obtaining module, the processing module, the storage module, and the device control module, may be mutually combined or distributed in different hardware devices, or may be further split into submodules based on functions. This is not limited.

The embodiments may provide a cockpit system, including the foregoing cockpit system adjustment apparatus, a head-up display HUD device, and a seat device.

Figure 6:
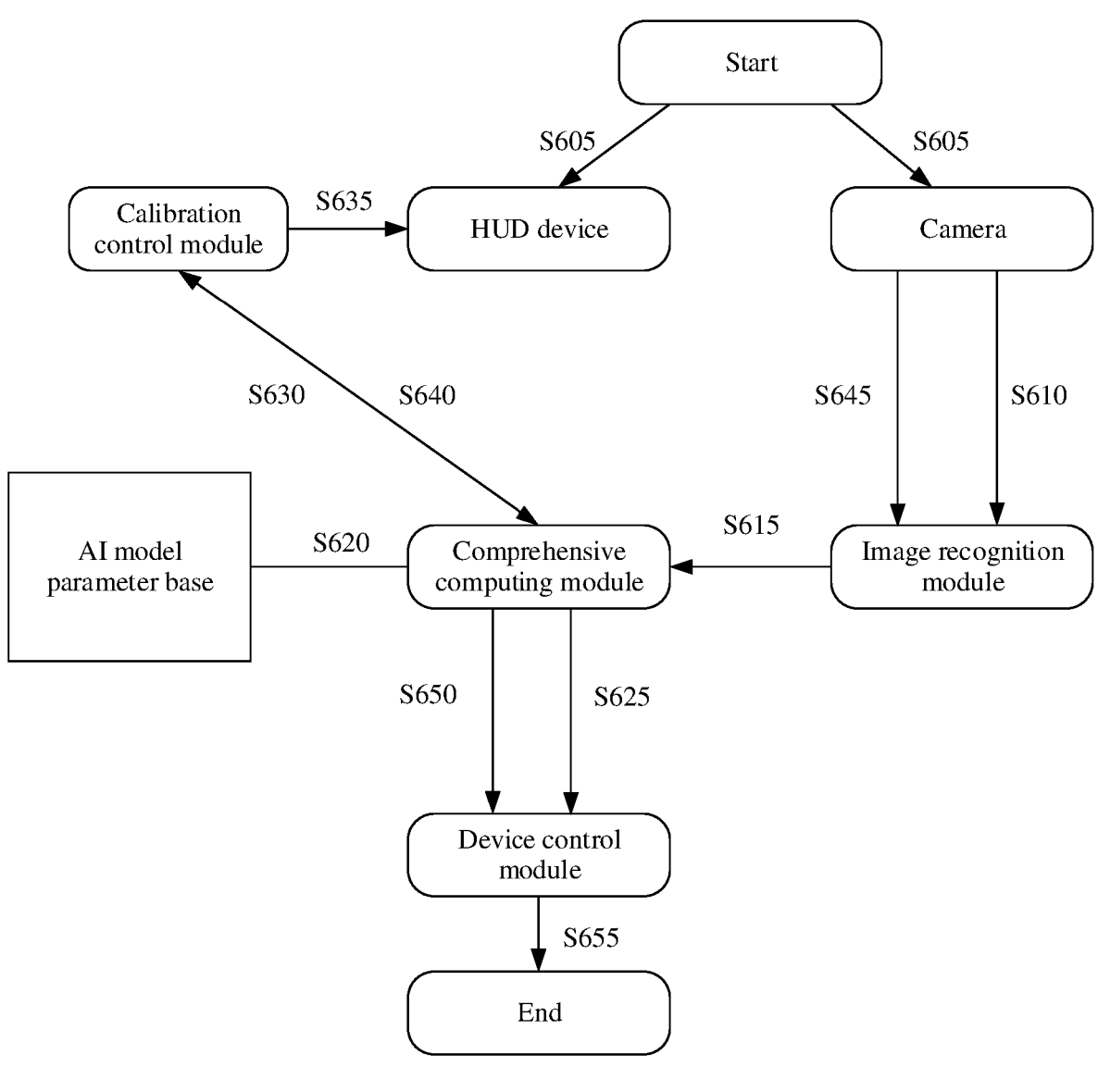
FIG. 6 is a schematic diagram of a cockpit system adjustment process according to an embodiment.

FIG. 6 is a schematic diagram of a cockpit system adjustment process 600 according to an embodiment. In the example shown in FIG. 6, the process 600 includes the following steps.

S605: In a still state of a vehicle, a user starts a cockpit system, including a camera (which corresponds to an image obtaining module) and a HUD device.

S610: The camera obtains a face of the user and sends the face to an image recognition module.

S615: The image recognition module performs facial recognition to obtain face information and sends the face information to a comprehensive computing module.

S620: The comprehensive computing module searches a user identity information base in an AI model parameter base, and performs S625 if there is matched face information, or perform S630 if there is no matched face information.

S625: Send, to a device control module, cockpit system configuration information applicable to the user and that matches the face information. The device control module adjusts the HUD device and a seat device based on the cockpit system configuration information applicable to the user. S655 is performed, and the process ends.

S630: Send an indication to a calibration control module.

S635: The calibration control module controls the HUD device to display a plurality of calibration points to the user.

S640: The calibration control module sends location information of the plurality of AR calibration points to the comprehensive computing module.

S645: The camera obtains a user image generated when the user watches the plurality of AR calibration points and sends the user image to the image recognition module.

S615: The image recognition module determines human eye location information and height information based on the user image and sends the human eye location information and the height information to the comprehensive computing module.

S650: The comprehensive computing module determines an observation angle, a total height, a leg length, and a depth from the user to a steering wheel based on the location information of the plurality of AR calibration points, the human eye location information, and the height information. The comprehensive computing module determines (for example, based on the AI model parameter base) cockpit system configuration information applicable to the user, and sends the cockpit system configuration information to a device control module. The device control module adjusts the HUD device and a seat device based on the cockpit system configuration information applicable to the user. S655 is performed, and the process ends.

S655: End the process.

The embodiments may provide a cockpit system adjustment method. A cockpit system includes a head-up display HUD device and a seat device. FIG. 7 is a schematic flowchart of a cockpit system adjustment method 700 according to an embodiment. As shown in FIG. 7, the method 700 may include the following steps.

S710: Control a HUD device to display a plurality of augmented reality AR calibration points to a user.

S720: Obtain a user image generated when the user watches the plurality of AR calibration points.

S730: Determine, based on the user image and location information of the plurality of AR calibration points, observation angle information generated when the user watches the plurality of AR calibration points and height information of the user.

S740: Determine, based on the observation angle information and the height information, cockpit system configuration information applicable to the user. The cockpit system configuration information includes a HUD device configuration parameter and a seat device configuration parameter.

According to the cockpit system adjustment method in this embodiment, the plurality of AR calibration points are displayed to the user, the user image generated when the user watches the plurality of AR calibration points is obtained, the observation angle information and the height information of the user are determined based on the user image, and the HUD device configuration parameter and the seat device configuration parameter that are applicable to the user are determined based on the observation angle information and the height information, so that the user can simultaneously achieve a good observation effect and high driving comfort. In addition, no additional infrared detection or pressure sensing device is required. This can reduce system costs.

In some embodiments, in S730, the determining, based on the user image and location information of the plurality of AR calibration points, observation angle information generated when the user watches the plurality of AR calibration points and height information of the user may include: determining the observation angle information and the height information based on the location information of the plurality of AR calibration points by performing image analysis processing and human eye tracking processing on the user image.

In some embodiments, in S740, the determining, based on the observation angle information and the height information, cockpit system configuration information applicable to the user may include: determining a total height and a leg length of the user based on the height information; determining a depth from the user to a steering wheel based on the observation angle information; and determining, based on the observation angle information, the total height, the leg length, and the depth, the cockpit system configuration information applicable to the user.

In some embodiments, the determining, based on the observation angle information, the total height, the leg length, and the depth, the cockpit system configuration information applicable to the user may include: determining, based on deviation values obtained by comparing the observation angle information, the total height, the leg length, and the depth with prestored cockpit system configuration information in a cockpit system configuration information base, the cockpit system configuration information applicable to the user.

In some embodiments, the method 700 may further include: storing the cockpit system configuration information applicable to the user and identity information of the user in a user identity database.

In some embodiments, the identity information includes face information. The method 700 may further include: obtaining the face information of the user; finding, based on the face information and the user identity database, the cockpit system configuration information that is applicable to the user and that matches the face information; and adjusting a HUD device and a seat device based on the HUD device configuration parameter and the seat device configuration parameter.

In some embodiments, the HUD device configuration parameter includes at least one of a spatial light modulator (SLM) configuration parameter, a scattering screen configuration parameter, an image source configuration parameter, and a projection system translation configuration parameter.

It may be clearly understood by a person skilled in the art that, for the purpose of convenient and brief description, execution of steps of the foregoing described method may be implemented based on corresponding modules, units, and components in the foregoing product embodiments, and details are not described herein again.

The embodiments may further provide a non-transitory computer-readable medium, configured to store a computer program. The computer program includes instructions for performing the method 700.

The embodiments may further provide a computer program. The computer program includes instructions for performing the method 700.

The cockpit system adjustment apparatus in the embodiments, or the processing module and the storage module in the apparatus may be one or more chips. For example, the apparatus or the processing module in the apparatus may be a field-programmable gate array (FPGA), an application-specific integrated circuit (ASIC), a system on chip (SoC), a central processor unit (CPU), a network processor (NP), a digital signal processor (DSP), a micro controller unit (MCU), or a programmable logic device (PLD) or another integrated chip.

In an implementation process, steps in the foregoing methods can be implemented by using a hardware integrated logical circuit, or by using instructions in a form of software. The steps of the method with reference to the embodiments may be directly performed by a hardware processor or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that, the processing module in the embodiments may be an integrated circuit chip and may have a signal processing capability. In an implementation process, steps in the foregoing method embodiments can be implemented by using a hardware integrated logical circuit in the processing module, or by using instructions in a form of software. The processing module may be a general purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are in the embodiments. The general purpose processor may be a microprocessor or the processor may also be any conventional processor, decoder, and the like. A software module may be located in a mature storage medium in the art, such as a random access memory, a flash memory, a read-only memory, a programmable read-only memory, an electrically erasable programmable memory, or a register. The storage medium is located in the memory, and a processing module reads information in the memory and completes the steps in the foregoing methods in combination with hardware of the processing module.

It may be understood that the storage module in the embodiments may be a volatile memory or a nonvolatile memory or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described includes, but is not limited to, these and any memory of another proper type.

It should be understood that various numeric numbers in the embodiments are only used for differentiation for ease of description but are not intended to limit the scope of the embodiments.

It should be understood that sequence numbers of the foregoing processes do not mean execution sequences in the embodiments. The execution sequences of the processes should be determined according to functions and internal logic of the processes and should not be construed as any limitation on the implementation processes of the embodiments.

A person of ordinary skill in the art may be aware that, in combination with the examples described in embodiments, units and algorithm steps may be implemented by electronic hardware or a combination of computer software and electronic hardware. Whether the functions are performed by hardware or software depends on constraint conditions of the solutions. A person skilled in the art may use different methods to implement the described functions for each particular application, but it should not be considered that the implementation goes beyond the scope of the embodiments.

In the several embodiments, it should be understood that the system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a non-transitory computer-readable storage medium. Based on such an understanding, the embodiments essentially, or the part contributing to the prior art, or some of the embodiments may be implemented in a form of a software product. The computer software product is stored in a non-transitory storage medium and includes several instructions for instructing a computer device (which may be a personal computer, a server, or a network device) to perform all or some of the steps of the methods described in the embodiments. The foregoing non-transitory storage medium includes any medium that can store program code, such as a USB flash drive, a removable hard disk, a read-only memory (ROM), a random access memory (RAM), a magnetic disk, or an optical disc.

The foregoing descriptions are merely implementations but are not intended to limit the scope of the embodiments. Any variation or replacement readily figured out by a person skilled in the art shall fall within the scope of the embodiments.

The invention claimed is:

1. A cockpit system adjustment apparatus, wherein a cockpit system comprises a head-up display (HUD) device and a seat device, and the cockpit system adjustment apparatus comprises:
   a calibration control module, configured to control the HUD device to display a plurality of augmented reality (AR) calibration points to a user;
   an image obtaining module, configured to obtain a user image generated when the user watches the plurality of AR calibration points;
   a processing module, configured to: determine, based on the user image and location information of the plurality of AR calibration points, cockpit system configuration information applicable to the user, wherein the cockpit system configuration information comprises a HUD device configuration parameter and a seat device configuration parameter, wherein the seat device configuration parameter includes information for adjusting a position or angle of the seat device; and
   a device control module, configured to adjust the HUD device based on the HUD device configuration parameter and adjust the seat device based on the seat device configuration parameter as part of a calibration process.

2. The apparatus according to claim 1, wherein that the processing module determines, based on the user image and the location information of the plurality of AR calibration points, the cockpit system configuration information applicable to the user comprises:

the processing module determines observation angle information generated when the user watches the plurality of AR calibration points and height information of the user; and
the processing module determines, based on the observation angle information and the height information, the cockpit system configuration information applicable to the user.

3. The apparatus according to claim 2, wherein the processing module is further configured to:
   determine the observation angle information and the height information based on the location information of the plurality of AR calibration points by performing image analysis processing and human eye tracking processing on the user image.

4. The apparatus according to claim 2, wherein the processing module is further configured to:
   determine a total height and a leg length of the user based on the height information;
   determine a depth from the user to a steering wheel based on the observation angle information; and
   determine, based on the observation angle information, the total height, the leg length, and the depth, the cockpit system configuration information applicable to the user.

5. The apparatus according to claim 4, wherein the processing module is further configured to:
   determine, based on deviation values obtained by comparing the observation angle information, the total height, the leg length, and the depth with prestored cockpit system configuration information in a cockpit system configuration information base, the cockpit system configuration information applicable to the user.

6. The apparatus according to claim 1, wherein the apparatus further comprises a storage module, configured to store the cockpit system configuration information applicable to the user and identity information of the user in a user identity information base.

7. The apparatus according to claim 6, wherein the identity information comprises face information, and processing module is further configured to:
   obtain the face information of the user; and
   find, based on the face information and the user identity information base, the cockpit system configuration information applicable to the user and that matches the face information.

8. The apparatus according to claim 1, wherein the HUD device configuration parameter comprises a scattering screen configuration parameter.

9. The apparatus according to claim 8, wherein the scattering screen configuration parameter includes a rotation angle for a scattering screen, wherein the scattering screen includes a diffuser or a curtain.

10. The apparatus according to claim 1, wherein the seat device configuration parameter includes a height, a front-back location, a left-right location, and an inclination of the angle of the seat device.

11. A cockpit system adjustment method, wherein a cockpit system comprises a head-up display (HUD) device and a seat device, and the method comprises:
   controlling the HUD device to display a plurality of augmented reality (AR) calibration points to a user;
   obtaining observation angle information generated when the user watches the plurality of AR calibration points;
   determining, based on the observation angle information, cockpit system configuration information applicable to the user, wherein the cockpit system configuration information comprises a HUD device configuration parameter and a seat device configuration parameter, wherein the seat device configuration parameter includes information for adjusting a position or angle of the seat device; and adjusting the HUD device based on the HUD device configuration parameter and adjust the seat device based on the seat device configuration parameter as part of a calibration process.

12. The method according to claim 11, wherein the obtaining observation angle information generated when the user watches the plurality of AR calibration points comprises:

obtaining the observation angle information generated when the user watches the plurality of AR calibration points and height information of the user; and the determining, based on the observation angle information, cockpit system configuration information applicable to the user comprises:

determining, based on the observation angle information and the height information, the cockpit system configuration information applicable to the user.

13. The method according to claim 12, wherein the obtaining observation angle information generated when the user watches the plurality of AR calibration points comprises:

obtaining a user image generated when the user watches the plurality of AR calibration points; and determining, based on the user image and location information of the plurality of AR calibration points, the observation angle information generated when the user watches the plurality of AR calibration points.

14. The method according to claim 13, wherein the determining, based on the user image and location information of the plurality of AR calibration points, the observation angle information generated when the user watches the plurality of AR calibration points comprises:

determining the observation angle information based on the location information of the plurality of AR calibration points by performing image analysis processing and human eye tracking processing on the user image.

15. The method according to claim 12, wherein the determining, based on the observation angle information and the height information, the cockpit system configuration information applicable to the user comprises:

determining a total height and a leg length of the user based on the height information;

determining a depth from the user to a steering wheel based on the observation angle information; and determining, based on the observation angle information, the total height, the leg length, and the depth, the cockpit system configuration information applicable to the user.

16. The method according to claim 15, wherein the determining, based on the observation angle information, the total height, the leg length, and the depth, the cockpit system configuration information applicable to the user comprises:

determining, based on deviation values obtained by comparing the observation angle information, the total height, the leg length, and the depth with prestored cockpit system configuration information in a cockpit system configuration information base, the cockpit system configuration information applicable to the user.

17. The method according to claim 11, wherein the method further comprises:

storing the cockpit system configuration information applicable to the user and identity information of the user in a user identity information base.

18. The method according to claim 17, wherein the identity information comprises face information, and the method further comprises:

obtaining the face information of the user; and finding, based on the face information and the user identity information base, the cockpit system configuration information applicable to the user and that matches the face information.

19. The method according to claim 11, wherein the HUD device configuration parameter comprises a scattering screen configuration parameter and, an image source configuration parameter.

20. A non-transitory computer-readable medium, wherein the non-transitory computer-readable medium stores computer-executable instructions, and the computer-executable instructions, when executed, are used to implement a cockpit system adjustment method, wherein a cockpit system comprises a head-up display (HUD) device and a seat device, and wherein the method comprises:

controlling the HUD device to display a plurality of augmented reality (AR) calibration points to a user;

obtaining observation angle information generated when the user watches the plurality of AR calibration points;

determining, based on the observation angle information, cockpit system configuration information applicable to the user, wherein the cockpit system configuration information comprises a HUD device configuration parameter and a seat device configuration parameter, wherein the seat device configuration parameter includes information for adjusting a position or angle of the seat device; and adjusting the HUD device based on the HUD device configuration parameter and adjust the seat device based on the seat device configuration parameter as part of a calibration process.

* * * * *